(12) United States Patent
Tamura et al.

(10) Patent No.: US 11,316,395 B2
(45) Date of Patent: Apr. 26, 2022

(54) METHOD OF MANUFACTURING ARMATURE COIL

(71) Applicant: Mitsubishi Electric Corporation, Tokyo (JP)

(72) Inventors: Koji Tamura, Tokyo (JP); Shuichi Tamura, Tokyo (JP); Akihiro Yamamura, Tokyo (JP); Issei Doi, Tokyo (JP); Hiroyuki Matsuo, Tokyo (JP); Yasukazu Nishimura, Tokyo (JP); Sachiko Kawasaki, Tokyo (JP); Akihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 326 days.

(21) Appl. No.: 16/421,600

(22) Filed: May 24, 2019

(65) Prior Publication Data

US 2019/0280543 A1    Sep. 12, 2019

Related U.S. Application Data

(62) Division of application No. 15/639,090, filed on Jun. 30, 2017, now Pat. No. 10,644,556, which is a
(Continued)

(51) Int. Cl.
*H02K 15/02*    (2006.01)
*H02K 3/12*    (2006.01)
(Continued)

(52) U.S. Cl.
CPC ............... *H02K 3/12* (2013.01); *H02K 1/16* (2013.01); *H02K 15/04* (2013.01);
(Continued)

(58) Field of Classification Search
CPC ............... H02K 15/04; H02K 15/0407; H02K 15/0414; H02K 15/0421; H02K 3/12;
(Continued)

(56) References Cited

U.S. PATENT DOCUMENTS

2004/0207283 A1    10/2004    Oohashi et al.
2005/0258704 A1    11/2005    Oohashi et al.
(Continued)

FOREIGN PATENT DOCUMENTS

CN        1405949 A        3/2003
DE    102006016249 A1    10/2007
(Continued)

OTHER PUBLICATIONS

Communication dated Jan. 2, 2018 from the State Intellectual Property Office of the P.R.C. in counterpart Application No. 201380075963.1.
(Continued)

*Primary Examiner* — A. Dexter Tugbang
(74) *Attorney, Agent, or Firm* — Sughrue Mion, PLLC; Richard C. Turner

(57) ABSTRACT

A method of manufacturing an armature coil includes steps of arranging a plurality of coil conductors of the armature coil between an end metal die and a back portion metal die on a lower metal die; pressing, with the upper metal die in a pressing direction, the plurality of the coil conductors arranged between the end metal die and the back portion metal die on the lower metal die; and removing coil conductors that become formed in a convex shape and a concave shape from the lower metal die. The upper metal die may be provided with an inclined portion on a lower metal die side of the upper metal die, and the upper metal die may be configured to be pressed such that a space is formed by the dies, the space having a width that gets gradually narrower.

4 Claims, 3 Drawing Sheets

Related U.S. Application Data division of application No. 14/650,335, filed as application No. PCT/JP2013/062342 on Apr. 26, 2013, now Pat. No. 9,960,650.

(51) Int. Cl.
  *H02K 15/04* (2006.01)
  *H02K 1/16* (2006.01)

(52) U.S. Cl.
  CPC ..... *H02K 15/0407* (2013.01); *H02K 15/0414* (2013.01); *H02K 15/0421* (2013.01); *Y10T 29/49009* (2015.01); *Y10T 29/49073* (2015.01); *Y10T 29/49117* (2015.01); *Y10T 29/5327* (2015.01); *Y10T 29/53235* (2015.01)

(58) Field of Classification Search
  CPC ................ H02K 1/16; Y10T 29/49073; Y10T 29/49009; Y10T 29/53235; Y10T 29/5327; Y10T 29/49117
  See application file for complete search history.

(56) References Cited

U.S. PATENT DOCUMENTS

| | | |
|---|---|---|
| 2010/0295390 A1 | 11/2010 | Rau et al. |
| 2012/0139383 A1 | 6/2012 | Wolf et al. |
| 2012/0200190 A1* | 8/2012 | Matsuoka .......... H02K 15/0421 310/179 |
| 2012/0274172 A1 | 11/2012 | Koga |
| 2013/0037321 A1* | 2/2013 | Murata ............. Y10T 29/49117 174/72 A |
| 2016/0056696 A1 | 2/2016 | Ito et al. |

FOREIGN PATENT DOCUMENTS

| | | | |
|---|---|---|---|
| EP | 0 695 019 A1 | 1/1996 | |
| JP | 02-285953 A | 11/1990 | |
| JP | 02-311149 A | 12/1990 | |
| JP | 7-32551 A | 4/1995 | |
| JP | 8-205441 A | 8/1996 | |
| JP | 2661263 B2 | 10/1997 | |
| JP | 2003-88021 A | 3/2003 | |
| JP | 2007-135329 A | 5/2007 | |
| JP | 2009-532009 A | 9/2009 | |
| JP | 2010263771 A * | 11/2010 | ......... H02K 15/0421 |
| JP | 2012-235587 A | 11/2012 | |
| SU | 1693687 A1 | 11/1991 | |

OTHER PUBLICATIONS

Communication dated Aug. 15, 2017, issued by the State Intellectual Property Office of People's Republic of China in counterpart Application No. 201380075963.1.
Communication dated Dec. 1, 2015 from the Japanese Patent Office in counterpart application No. 2015-513453.
Communication dated Dec. 9, 2016, from the European Patent Office in counterpart European Application No. 13882661.5.
Communication dated Feb. 27, 2017, from the State Intellectual Property Office of People's Republic of China in counterpart Application No. 201380075963.1.
Communication dated Oct. 6, 2015 from the Japanese Patent Office in corresponding application No. 2015-513453.
Communication dated Sep. 29, 2017, from European Patent Office in counterpart application No. 13882661.5.
International Search Report of PCT/JP2013/062342 dated Jul. 2, 2013.
Communication dated Jul. 25, 2019 from the United States Patent and Trademark Office in U.S. Appl. No. 15/639,090.
Office Action dated Feb. 28, 2022 in Indian Application No. 201948025007.

* cited by examiner (a)

(b)

METHOD OF MANUFACTURING ARMATURE COIL

CROSS-REFERENCE TO RELATED APPLICATION

This application is a divisional of U.S. application Ser. No. 15/639,090 filed Jun. 30, 2017, which application is a divisional of U.S. application Ser. No. 14/650,335 filed Jun. 8, 2015, which is a 371 National Stage Application of PCT/JP2013/062342 filed Apr. 26, 2013; the above-noted applications are incorporated herein by reference in their entirety.

TECHNICAL FIELD

The present invention relates to an armature coil for use in a rotary electric machine and a method of manufacturing the same and, more particularly, relates to the shape of the armature coil.

BACKGROUND ART

Hitherto, a coil wound around a stator or a rotor of a rotary electric machine passes through in line in slots that are holding portions for the coil. More particularly, there are disclosed a coil whose coil conductor cross-section is formed in a rectangular shape or a trapezoidal shape along the shape of the slot and a coil whose coil conductor shape is formed in a trapezoidal shape that is different depending on a slot insertion position. Furthermore, one side and the other side of the coil conductor are formed in parallel planes. (Refer to FIG. 12 of Patent Document 1.)

Moreover, in a conventional method of manufacturing a coil, there is disclosed one in which at least a portion of a coil to be inserted into a slot is inserted and arranged in a forming die having a previously determined trapezoidal shaped groove and a coil conductor is pressed by a pressing die to be formed in a trapezoidal shape. Furthermore, one side and the other side of the coil conductor are formed in parallel planes. (Refer to Patent Document 2.)

RELATED ART DOCUMENT

Patent Document

Patent Document 1: Japanese Patent Gazette No. 3474660
Patent Document 2: Japanese Examined Patent Publication No. H7-32551

SUMMARY OF THE INVENTION

Problems to be Solved by the Invention

Even if the above-described conventional armature coil and method of manufacturing the same, a space factor is improved by deforming to the coil conductor shape along the slot shape. However, further high output of the rotary electric machine is required in recent years; and a problem exists in that the space factor needs to be further improved.

The present invention has been made to solve the above described problem, and an object of the present invention is to provide an armature coil and a method of manufacturing the same, which can further improve a space factor.

Means for Solving the Problems

According to the present invention, there is provided an armature coil in which a plurality of slots through which coil conductors pass are annularly arranged and a plurality of the coil conductors pass through the inside of the slot in line. In the armature coil, the circumferential width of the plurality of the coil conductors is formed in a substantially trapezoidal shape which gets narrower toward the radially inner side and the cross-sectional areas of the plurality of the coil conductors in the slot are each substantially the same and the circumferential width thereof is formed narrower as the coil conductor is arranged toward the radially inner side; and one coil conductor is formed in a convex shape and another coil conductor is formed in a concave shape along the convex shape.

Furthermore, according to the present invention, there is provided a method of manufacturing an armature coil including the steps of: arranging a plurality of coil conductors on a lower metal die having a taper-shaped groove substantially the same as a slot which is wound with the plurality of the coil conductors of the armature coil and is formed in a trapezoidal shape which gets narrower in width toward the radially inner side; pressing the coil conductors arranged in the groove of the lower metal die by an upper metal die having a rod-shaped end portion slightly narrower than the width of the groove; forming more flattened toward the coil conductor arranged at the end of the groove by being pressed to a predetermined position by the rod-shaped end portion of the upper metal die, forming an aspect ratio smaller toward the coil conductor near an opening portion of the groove, and forming such that one coil conductor is formed in a convex shape and another coil conductor is formed in a concave shape along the convex shape at between the coil conductors; and removing the coil conductors formed in the convex shape and the concave shape from the lower metal die.

Further, according to the present invention, there is provided a method of manufacturing an armature coil, including the steps of: having a lower metal die which is provided with an end metal die at a left end portion and a back portion metal die at a right end portion and an upper metal die which is provided with an inclined portion on the lower metal die side and is to be pressed, forming such that a space formed by the respective metal dies is substantially the same as the shape of a slot and the width of the space gets gradually narrower toward the direction of the end metal die when the upper metal die is moved to come in contact with the upper surfaces of the end metal die and the back portion metal die of the lower metal die, and arranging a plurality of coil conductors of the armature coil between the end metal die and the back portion metal die on the lower metal die; pressing the plurality of the coil conductors arranged between the end metal die and the back portion metal die on the lower metal die by the upper metal die; forming more flattened toward the coil conductor near the end metal die by being pressed to a position coming in contact with the upper surfaces of the end metal die and the back portion metal die of the lower metal die by the upper metal die, forming an aspect ratio smaller toward the coil conductor near the back portion metal die, and forming such that one coil conductor is formed in a convex shape and another coil conductor is formed in a concave shape along the convex shape at between the coil conductors; and removing the coil conductors formed in the convex shape and the concave shape from the lower metal die.

Advantageous Effect of the Invention

According to the present invention, the degree of joining between the coil conductors is increased by forming the shape of a coil conductor cross-section in the slot in concave and convex shapes and thereby improving a space factor, whereby, as a result, there can be provided the armature coil of a high output rotary electric machine.

MODE FOR CARRYING OUT THE INVENTION

Embodiment 1

Figure 1:
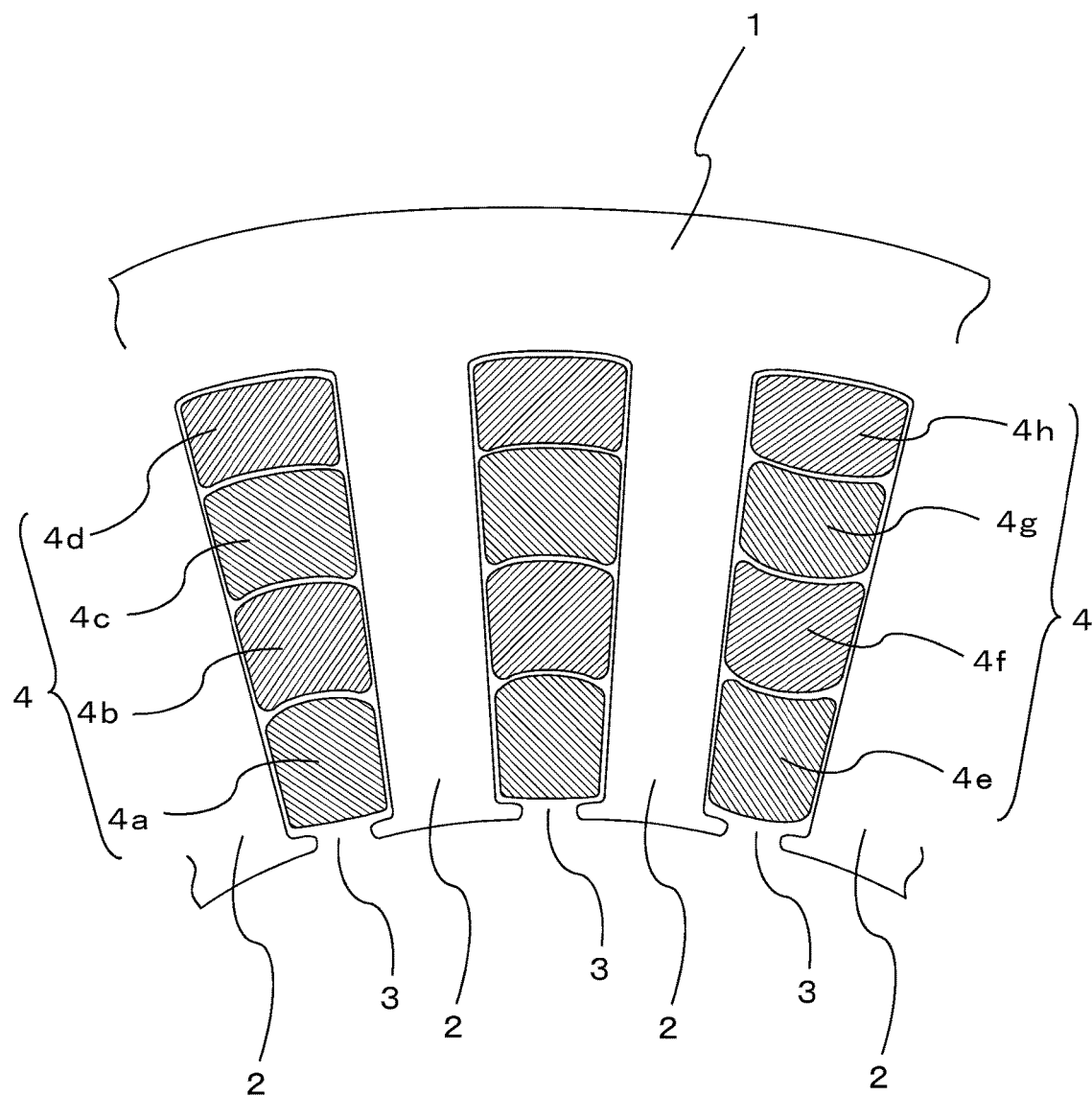
FIG. 1 is a partially sectional view showing a coil insertion state in an armature coil according to Embodiment 1 of the present invention.

Hereinafter, Embodiment 1 of the present invention will be described with reference to FIG. 1. FIG. 1 describes on a case where a rotary electric machine serves as a motor and a stator is used as an armature; however, FIG. 1 can also be applied to a case where a rotor is used. FIG. 1 is a partially sectional view showing a coil insertion state in an armature coil according to Embodiment 1 of the present invention.

The stator is formed in a cylindrical shape by a stator core 1 which is configured by laminating a plurality of thin steel sheets; and a large number of teeth 2 are arranged toward the radially inner side. A slot 3 is formed between these teeth 2. A first coil conductor 4a, a second coil conductor 4b, a third coil conductor 4c, and a fourth coil conductor 4d or a first coil conductor 4e, a second coil conductor 4f, a third coil conductor 4g, and a fourth coil conductor 4h pass through these slots 3 to constitute an armature coil 4.

The following description will be made such that the armature coil 4 passing through the slot 3 is composed of, for example, four coil conductors. The armature coil 4 constituting a winding of the stator may be of a pine needle shaped segment coil or one in which a continuous wire is regularly formed in a wave shape. The armature coil 4 is generally classified into a crossover portion (not shown in the drawing) outgoing from a tooth 2 and incoming into another tooth 2 and a straight slot insertion portion to be inserted into the slot 3. More particularly, the slot insertion portion has an important role in which current flowing in the armature coil 4 makes the rotor (not shown in the drawing) rotate by repulsion or attraction between magnetic poles of the rotor via the teeth 2. More specifically, in the case of designing an efficient motor, as for the armature coil 4, reduction in copper loss is effective and therefore an improvement of a space factor is an important factor. In this case, the space factor is termed as the ratio of the cross-sectional area of the armature coil 4 to the cross-sectional area of the slot.

A plurality of coil conductors of the armature coil 4 are wound and are inserted into the slot 3 of the stator core 1 which is configured by laminating the plurality of thin steel sheets; and therefore, the armature coil 4 is covered by a coating in order to secure insulation from the surrounding stator core 1. For such occasions, it is possible to form the cross-section of each coil conductor of the armature coil 4 in a polygonal shape such as a rectangular shape and a trapezoidal shape; however, such a shape has corner portions, the coating of the corner portions is usually thinner than a straight portion, and a pinhole is also likely to be occurred; and accordingly, there is a case which does not standup to actual use. Therefore, a quadrilateral shape whose corners are rounded is often used.

On the other hand, the stator is a cylindrical shape; and an inner diameter is inevitably shorter than an outer diameter and the periphery of the inner diameter is also shorter than the periphery of the outer diameter. There exists the slot 3 whose inner diameter side width is substantially equal to an outer diameter side width and the inner diameter width is smaller than the outer diameter width as shown in FIG. 1. In the case where the inner diameter width is equal to the outer diameter width, the end side width of the tooth 2 must needs be smaller than a root width thereof. Magnetic flux passing through the tooth 2 is restricted by the narrowest width of the tooth 2; and, in a sense, it is unnecessary to pass the magnetic flux in the root having a too large width. Accordingly, in the case where the width of the tooth 2 is scarcely changed, the width of the slot 3 gets inevitably narrower toward the inner diameter.

In the case of inserting the first coil conductor 4a, the second coil conductor 4b, the third coil conductor 4c, and the fourth coil conductor 4d, or the first coil conductor 4e, the second coil conductor 4f, the third coil conductor 4g, and the fourth coil conductor 4h of the armature coil 4 in such the inner side tapered slot 3, it is effective to form the armature coil 4 having a coil cross-section along the inside shape of the slot 3 in order to improve the space factor. Furthermore, in consideration of appropriately flowing current in the armature coil 4, the same cross-sectional area is more convenient. Based on these considerations, it is effective to form the armature coil 4 in a trapezoidal shape in quadrilateral shapes and to form the aspect ratio larger toward the inner diameter side.

Furthermore, the inserted armature coil 4 is composed of a plurality of coil conductors, it is troublesome in view of a process to form each coil conductor into a predetermined different shape one by one and forming cost also increases; and therefore, it is more expedient to form the plurality of coil conductors into a predetermined shape in bundle. Further, it is more advantageous spatially to narrow the interval between the respective coil conductors of the armature coil 4 and to firmly attach as much as possible. Moreover, there is also an effect that heat dissipation properties are the same between the respective coil conductors of the armature coil 4. Consequently, one coil conductor of the armature coil 4 is formed in a convex shape at one radially end and another coil conductor of the armature coil 4, which firmly attaches to one coil conductor, is formed in a concave shape at the other radially end along the convex shape; and thus, contact properties between the respective coil conductors of the armature coil 4 are increased and therefore the space factor is improved.

Furthermore, the cross-sectional areas of the respective coil conductors of the armature coil 4 are all the same; and therefore, for example, the aspect ratio of the first coil conductor 4a of the armature coil 4, the first coil conductor 4a being located on the inner diameter side of the slot 3, is larger than that of the second coil conductor 4b of the armature coil 4, the second coil conductor 4b being located on the outer diameter side. Therefore, it is more advantageous to make the aspect ratio larger, that is, to make the convex portion larger at one end of the first coil conductor 4a on the inner diameter side of the armature coil 4. In FIG. 1, the outer diameter side of the first coil conductor 4a of the armature coil 4 is formed in the convex shape and the inner diameter side of the second coil conductor 4b of the armature coil 4 on the outer layer side thereof is formed in the concave shape along the convex shape. Similarly, although there is a difference in the size of the convex shape and the concave shape, the third coil conductor 4c and the fourth coil conductor 4d of the armature coil 4 are also formed in the convex shape and the concave shape. Incidentally, the sides coming in contact with the insides of the slot 3 are inner diameter side tapered lines (lines which get narrower toward the inner diameter side) along the shape of the slot 3. Further, its straight portion is joined to the convex shaped portion and the concave shaped portion with roundness formed at their corners.

Furthermore, there is shown an example in which the direction of the convex shape of the coil conductors 4e to 4h of the armature coil 4 is an opposite direction as compared to that of the coil conductors 4a to 4d of the armature coil 4. The convex shape may be placed in the same direction as the whole stator or may be changed, for example, for each phase. In this regard, however, it is not expedient to change the direction of the convex shape in the same slot 3 from a viewpoint of the space factor. Furthermore, in the case where four or more coil conductors of the armature coil 4 are inserted in the slot 3, and in the case of a pair of the armature coils 4 or in the case of, for example, a pair of each two coil conductors of the armature coil 4 from a view point of the shape of a coil winding, it is conceivable that each two coil conductors of the armature coil 4 are formed. Therefore, the armature coil 4 may be made such that concave and convex shapes are formed between a first layer and a second layer and between a third layer and a fourth layer; and the concave and convex shapes are not formed between the second layer and the third layer, but may be formed in a substantially straight line.

Further, in the case of forming the shape between the coil conductors of the armature coil 4, it may be formed not only in the concave and convex shapes, but also it may be such that one coil conductor is formed in an S shape or a wave shape and another coil conductor is formed in an inverse S shape or an inverse wave shape along the S shape or the wave shape. The armature coil 4 extended from the slot 3 does not need to be forcedly formed as described above; however, a part of the armature coil 4 extended from an end portion of the slot 3 is formed as described above, whereby it becomes: the start of crossover for the winding of the armature coil 4, positioning of passing the coil into the slot 3, or prevention from interfering with an edge portion of the slot end.

Embodiment 2

Figure 2:
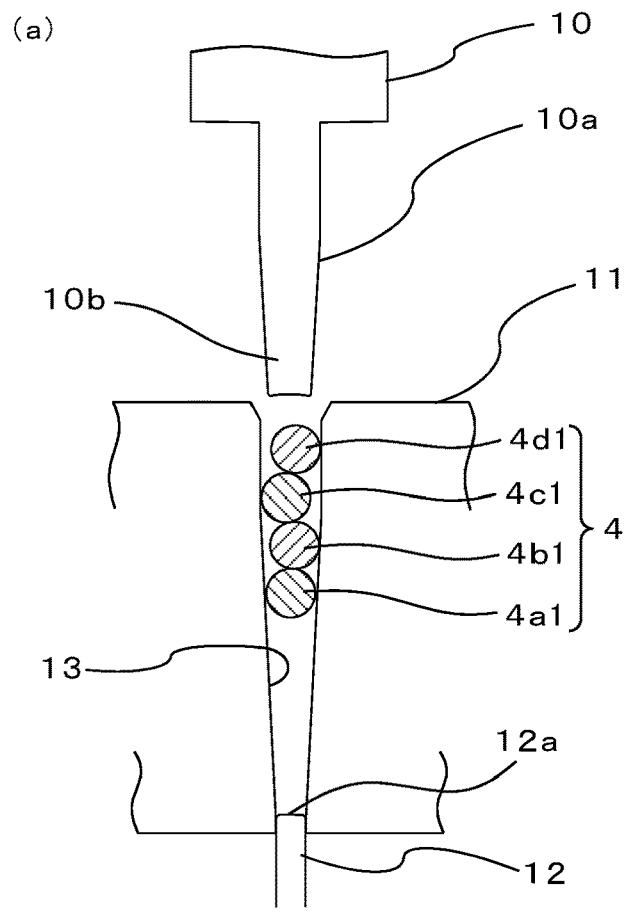
FIGS. 2(a), 2(b) are each a coil forming process view by a coil forming apparatus in an armature coil according to Embodiment 2 of the present invention.
Figure 2:
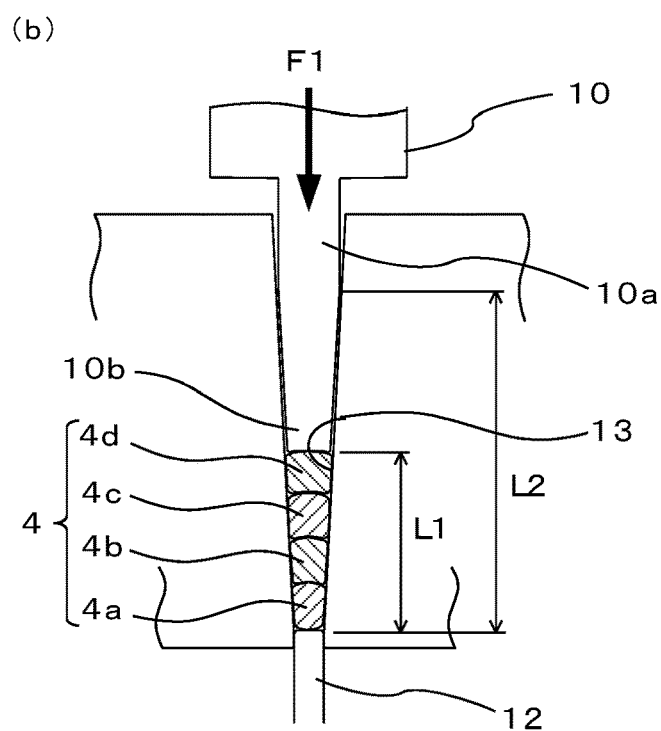

Next, Embodiment 2 of the present invention will be described with reference to FIGS. 2(a), 2(b). In this case, a method of forming the armature coil in the aforementioned Embodiment 1 will be described. FIGS. 2(a), 2 (b) are each a coil forming process view by a coil forming apparatus in the armature coil according to Embodiment 2 of the present invention.

FIGS. 2(a), 2(b) each shows the forming apparatus by an upper metal die 10 and a lower metal die 11; and the lower metal die 11 has a groove 13 whose width gets narrower in proportion to its depth. The shape of the groove 13 is substantially the same as the shape of a slot 3 into which respective coil conductors of an armature coil 4 are inserted. More particularly, a groove shape at a position shown by L1 in FIG. 2 (b) needs to be the same as the slot shape. Since other position is not directly involved in an improvement of a space factor, the whole of the groove 13 does not need to be formed in a funnel shape and may be parallel straight lines each having a width of a degree capable of arranging the coil conductors of the armature coil 4. Therefore, there is shown a case where the groove 13 is formed in the funnel shape as far as the height of L2 in FIG. 2(b) and is formed in a straight line from an upper portion thereof. With this configuration, in the drawing, even when a first coil conductor strand 4a1, a second coil conductor strand 4b1, a third coil conductor strand 4c1, and a fourth coil conductor strand 4d1 are sequentially arranged from an upper opening portion of the lower metal die 11, lamination with large off-center in the right and the left in the drawing is reduced.

An upper end portion 12a of a lower opening metal die 12 is preferable to be similar to the shape of a slot opening portion; however, a substantially straight line is also permissible. The upper metal die 10 has a pressing body 10a having a shape similar to the width of the groove 13; and an end portion of the pressing body 10a has a rod-shaped end portion 10b slightly narrower than the width of the groove 13. Furthermore, the shape of the rod-shaped end portion 10b of the upper metal die 10 is similar to the shape of a back portion of the slot 3. In the forming apparatus having such upper metal die 10 and lower metal die 11, first, the first coil conductor strand 4a1, the second coil conductor strand 4b1, the third coil conductor strand 4c1, and the fourth coil conductor strand 4d1 are sequentially arranged in the groove 13. FIGS. 2(a), 2 (b) each shows a case where four round wire coil conductor strands are formed at the same time. However, the method of forming the armature coil is not limited to this, but is irrespective of the cross-sectional shape of the coil conductor strand, and is not concerned to the number of coil conductor strands if the number of the coil conductor strands is a plural number.

A part of the outer periphery of the first coil conductor strand 4a1 of a lowermost portion is stopped by coming in contact with inner walls of the groove 13; and thereon, the second coil conductor strand 4b1, the third coil conductor strand 4c1, and the fourth coil conductor strand 4d1 are arranged in sequence. This state is a state before starting forming and is the state shown by FIG. 2(a). Subsequently, the pressing body 10a of the upper metal die 10 moves down in the groove 13 from the upper opening portion of the lower metal die 11. Then, the pressing body 10a of the upper metal die 10 further moves down to press the respective coil conductor strands by pressing force F1; and thus, deformation is gradually forwarded from the first coil conductor strand 4a1 located at the lower most portion along the groove width. Nothing exists between the respective coil conductor strands; and therefore, the coil conductor strands are formed more elongated toward the coil conductor strand having a large aspect ratio, that is, deformed in a convex shape. Then, the subsequent coil conductor strand is formed in a concave shape by the influence thereof and the other side is formed in a convex shape; and this is repeated in the subsequent coil conductor strands in sequence.

FIG. 2(b) shows a state where the upper metal die 10 is restricted by the lower opening metal die 12 and the first coil conductor 4a, the second coil conductor 4b, the third coil conductor 4c, and the fourth coil conductor 4d of the armature coil 4 are formed. After that, the upper metal die 10 is returned to an original position; the lower opening metal die 12 is moved in the upper direction in the drawing; the first coil conductor 4a, the second coil conductor 4b, the third coil conductor 4c, and the fourth coil conductor 4d of the armature coil 4 are pushed up; and the respective coil conductors of the armature coil 4 are removed from the lower metal die 11 to complete the forming process. And then, the first coil conductor 4a, the second coil conductor 4b, the third coil conductor 4c, and the fourth coil conductor 4d of the formed armature coil 4 are sequentially inserted into the slot 3 formed in the stator core 1 of the stator.

As described above, the first coil conductor strand 4a1, the second coil conductor strand 4b1, the third coil conductor strand 4c1, and the fourth coil conductor strand 4d1 of the armature coil 4 arranged in the tapered groove 13 are pressed to deform in sequence from the coil conductor strand of the armature coil 4 having a higher aspect ratio and, at the same time, are pressed so as to transfer the deformation between the coil conductor strands of the armature coil 4; and thus, one coil conductor of the armature coil 4 is formed in the convex shape and another next coil conductor of the armature coil 4 is formed in the concave shape conforming to the convex shape. This enhances contact properties between the coil conductors of the armature coil 4 and the space factor can be improved when the first coil conductor 4a, the second coil conductor 4b, the third coil conductor 4c, and the fourth coil conductor 4d of the armature coil 4 pass through the slot 3 formed in the stator core 1 of the stator.

The rod-shaped end portion 10b of the upper metal die 10 continues to press the first coil conductor strand 4a1, the second coil conductor strand 4b1, the third coil conductor strand 4c1, and the fourth coil conductor strand 4d1 of the armature coil 4; and therefore, it becomes possible to concentrate pressure, pressing force becomes smaller as compared in the case of pressing the flat shaped upper and lower metal dies, and the scale of the metal dies can also be miniaturized. Incidentally, it is possible to improve for easiness of forming by using, for example, the first coil conductor strand 4a1, the second coil conductor strand 4b1, the third coil conductor strand 4c1, and the fourth coil conductor strand 4d1 of the armature coil 4, each having a cross-section nearer to a trapezoid shape than a round wire, which facilitates to deform by once heating the first coil conductor strand 4a1, the second coil conductor strand 4b1, the third coil conductor strand 4c1, and the fourth coil conductor strand 4d1 of the armature coil 4. Further, the first coil conductor 4a, the second coil conductor 4b, the third coil conductor 4c, and the fourth coil conductor 4d of the armature coil 4 may be of a type in which, like a pine needle shaped segment coil, a winding is formed after inserting in the slot or may be one in which a continuous wire is wound to form a coil winding shape.

Embodiment 3

Figure 3:
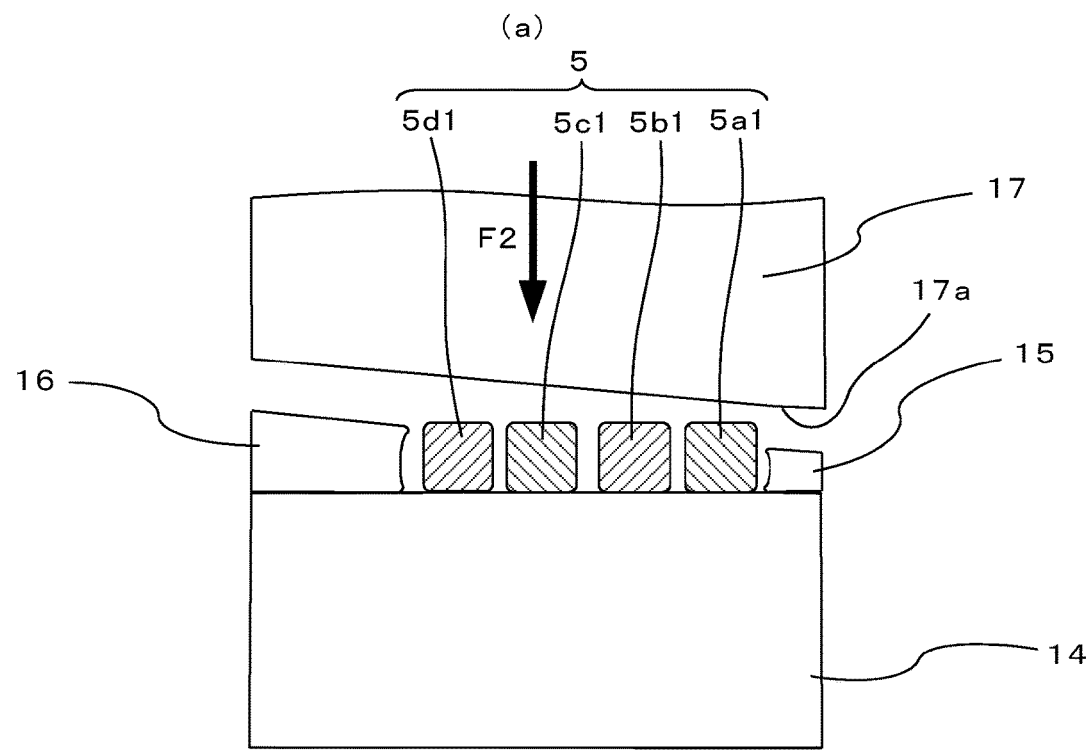
FIGS. 3(a), 3(b) are each a coil forming process view by a coil forming apparatus in an armature coil according to Embodiment 3 of the present invention.
Figure 3:
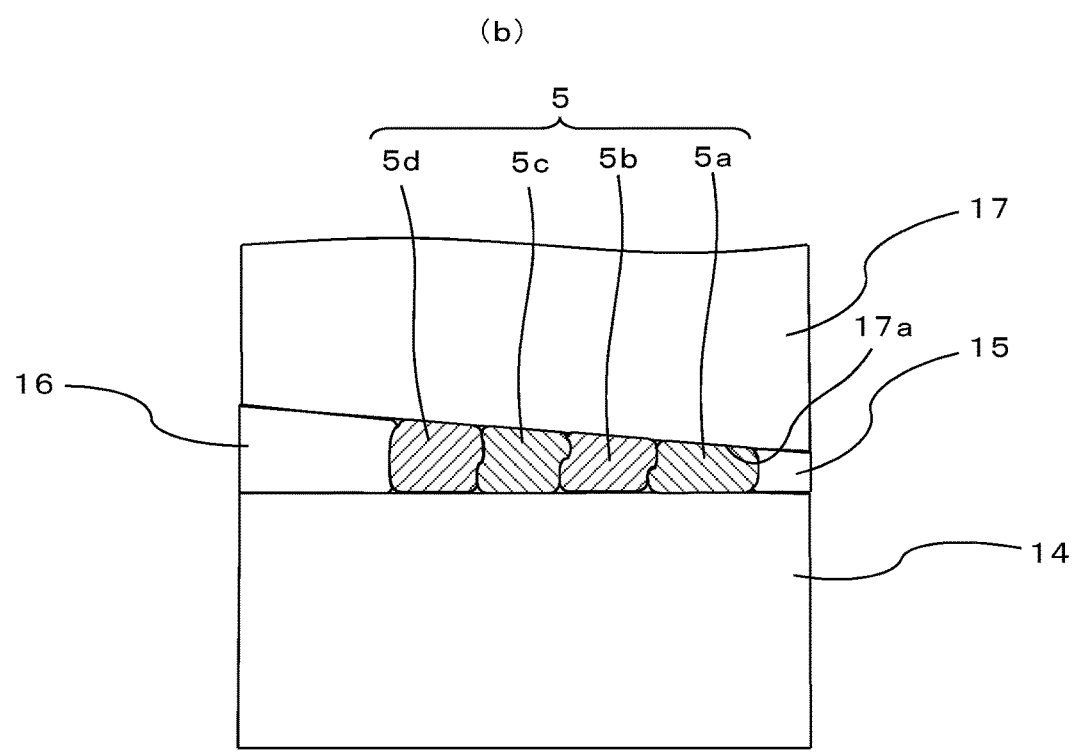

Next, Embodiment 3 of the present invention will be described with reference to FIGS. 3(a), 3(b). FIGS. 3(a), 3(b) are each a coil forming process view by a coil forming apparatus in an armature coil according to Embodiment 3 of the present invention.

The coil forming apparatus in Embodiment 3 of the present invention is composed of four metal die portions. For example, the coil forming apparatus includes: a lower metal die 14; an end metal die 15 which is mounted on the lower metal die 14 and has a shape similar to a slot end portion; a back portion metal die 16 which is mounted on the lower metal die 14 and is similar to a slot back portion; and an upper metal die 17. Incidentally, the upper metal die 17 has an inclined surface portion 17a inclined toward the right direction in the drawing and is made such that the inclined surface portion 17a of the upper metal die 17 can be pressed until coming in contact with the upper surfaces of the end metal die 15 and the back portion metal die 16 by pressing force F2. The end metal die 15 and the back portion metal die 16 may be integrated with the lower metal die 14.

The coil forming apparatus is composed of the above-described respective metal dies; and as shown in FIG. 3(a), a state where the upper metal die 17 is set in the upper direction is an initial state. In this state, a first coil conductor strand 5a1, a second coil conductor strand 5b1, a third coil conductor strand 5c1, and a fourth coil conductor strand 5d1 of an armature coil 5 are set between the end metal die 15 and the back portion metal die 16. In this Embodiment 3, a quadrilateral cross-section coil conductor is used; however, a round wire or elliptical cross-section coil conductor may be permissible. The setting of the first coil conductor strand 5a1, the second coil conductor strand 5b1, the third coil conductor strand 5c1, and the fourth coil conductor strand 5d1 of the armature coil 5 is preferable to be set with a slight gap, if possible. In this regard, however, as the respective coil conductor strands are deformed on the way to forming, other coil conductor strand is pushed in the left direction in the drawing; and therefore, the gap therebetween may be reasonable.

After the first coil conductor strand 5a1, the second coil conductor strand 5b1, the third coil conductor strand 5c1, and the fourth coil conductor strand 5d1 of the armature coil 5 are set, the upper metal die 17 is moved down to start pressing. This pressing is pressed by the inclined surface portion 17a of the upper metal die 17 from the first coil conductor strand 5a1 at the right end in the drawing to the second coil conductor strand 5b1, the third coil conductor strand 5c1, and the fourth coil conductor strand 5d1 in sequence. Lastly, the pressing is carried out as far as the fourth coil conductor strand 5d1 at the left end; and the pressing is completed at the time when the inclined surface portion 17a of the upper metal die 17 comes in contact with the upper surfaces of the end metal die 15 and the back portion metal die 16. More specifically, the shape of the each metal die is determined so that a space formed by the upper metal die 17 and the lower metal die 14 is substantially the same as a slot space. Therefore, as a result, the pressed respective coil conductor strands are formed along the slot shape.

Furthermore, a forming order is such that the pressing is made to deform from the right side coil conductor strand and thus the left side surface of the right end coil conductor strand is formed in a most convex shape; the right side surface of the next coil conductor strand is formed in a concave shape in reaction to the convex shape; and the left side surface thereof is formed in a convex shape and such a deformation is forwarded in sequence. As described above, when the pressing is carried out by planes from both sides of the coil conductor strand, to be exact, the state of the convex shape is formed in a wave shape composed of a partly convex shape and a partly concave shape. This concave and convex wave shape turns into a reverse concave and convex wave shape on the next coil. Furthermore, an aspect ratio gets larger toward the right side coil conductor strand and therefore its concave and convex state also gets larger toward the right side coil conductor strand.

As described above, as shown in FIG. 3(b), a first coil conductor 5a, a second coil conductor 5b, a third coil conductor 5c, and a fourth coil conductor 5d of the armature coil 5 are formed by pressing and forming from the upper and lower surfaces of the coil conductor strands by the upper metal die 17 and the lower metal die 14; and the concave and convex state is formed between the coil conductors. Then, when the first coil conductor 5a, the second coil conductor 5b, the third coil conductor 5c, and the fourth coil conductor 5d of the armature coil 5 are inserted into a slot 3 formed in a stator core 1, the degree of joining between the coil conductors is increased; and as a result, a space factor is improved. Incidentally, overheat process of the first coil conductor strand 5a1, the second coil conductor strand 5b1, the third coil conductor strand 5c1, and the fourth coil conductor strand 5d1 of the armature coil 5 may be previously performed so as to be easily formed.

Incidentally, the present invention can freely combine the respective embodiments and appropriately change and/or omit the respective embodiments, within the scope of the present invention.

DESCRIPTION OF REFERENCE NUMERALS

1 Stator core, 2 Tooth, 3 Slot, 4 Armature coil, 4a First coil conductor, 4b Second coil conductor, 4c Third coil conductor, 4d Fourth coil conductor, 5 Armature coil, 5a First coil conductor, 5b Second coil conductor, 5c Third coil conductor, 5d Fourth coil conductor, 10 Upper metal die, 11 Lower metal die, 12 Lower opening metal die, 13 Groove, 14 Lower metal die, 15 End metal die, 16 Back portion metal die, Upper metal die.

The invention claimed is:

1. A method of manufacturing an armature coil, comprising the steps of:

having a lower metal die, which is provided with an end metal die at a first side end portion of the lower metal die and a back portion metal die at a second side end portion of the lower metal die opposite of the first side end portion, and an upper metal die which is provided with an inclined portion on a lower metal die side of the upper metal die, the upper metal die configured to be pressed, such that a space formed by the lower metal die, the end metal die, the back portion metal die, and the upper metal die is substantially the same as a shape of a slot of a stator core, and a width of the space, in a first direction from the upper metal die to the lower metal die, gets gradually narrower in a second direction, that is towards the end metal die from the back portion metal die and perpendicular to the first direction, when the upper metal die is moved to come in contact with an upper surface of the end metal die and an upper surface of the back portion metal die;

arranging a plurality of coil conductors of the armature coil between the end metal die and the back portion metal die on the lower metal die, the plurality of coil conductors arranged with respect to each other in the second direction;

pressing, with the upper metal die in the first direction, the plurality of coil conductors arranged between the end metal die and the back portion metal die on the lower metal die such that:

the upper metal die reaches a position in which the upper metal die comes into contact with the upper surface of the end metal die and the upper surface of the back portion metal die, and in the position, (i) an amount of flattening of the plurality of coil conductors in the first direction increases towards the end metal die such that a first coil conductor that is closest to the end metal die, from among the plurality of coil conductors, is flattened the most from among the plurality of coil conductors, (ii) aspect ratios of cross-sections of the plurality of coil conductors decreases towards the back portion metal die such that a cross-section of the first coil conductor has a highest aspect ratio from among the plurality of coil conductors, and (iii) in a cross-sectional view of the plurality of coil conductors, one coil conductor from among the plurality of coil conductors is formed to include a first convex shape and another coil conductor from among the plurality of coil conductors is formed to include a first concave shape, that is along and directly facing the first convex shape of the one coil conductor; and removing the plurality of coil conductors from the lower metal die after forming the first convex shape and the first concave shape.

2. The method of manufacturing the armature coil according to claim 1, wherein the arranging comprises arranging the plurality of coil conductors such that the plurality of coil conductors are separated from each other in the second direction by at least one gap.

3. The method of manufacturing the armature coil according to claim 1, wherein the pressing comprises pressing such that, in the position, in the cross-sectional view of the plurality of coil conductors, the one coil conductor is formed in a wave shape to include the first convex shape as a first partly convex shape and a second partly concave shape, and the another coil conductor is formed to include the first concave shape as a first partly concave shape and a second partly convex shape, and the second partly concave shape is along and directly facing the second partly convex shape while the first partly convex shape is along and directly facing the first partly concave shape.

4. The method of manufacturing the armature coil according to claim 1, wherein the one coil conductor is the first coil conductor.

* * * * *